(12) United States Patent
Lu et al.

(10) Patent No.: US 7,283,699 B2
(45) Date of Patent: Oct. 16, 2007

(54) OPTICAL PACKAGE

(75) Inventors: Daoqiang Lu, Chandler, AZ (US); Henning Braunisch, Chandler, AZ (US); Gilroy Vandentop, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 10/954,903

(22) Filed: Sep. 30, 2004

(65) Prior Publication Data

US 2006/0067609 A1    Mar. 30, 2006

(51) Int. Cl.
G02B 6/26 (2006.01)
G02B 6/12 (2006.01)

(52) U.S. Cl. ............................. 385/15; 385/14; 385/27; 385/30

(58) Field of Classification Search .................. None
See application file for complete search history.

(56) References Cited

U.S. PATENT DOCUMENTS

| | | |
|---|---|---|
| 5,371,822 A | 12/1994 | Horwitz et al. |
| 6,118,670 A | 9/2000 | Radford et al. |
| 6,464,409 B1 | 10/2002 | Ooe |
| 6,550,983 B1 | 4/2003 | Gilliland et al. |
| 6,580,863 B2 | 6/2003 | Yegnanarayanan et al. |
| 6,587,605 B2 | 7/2003 | Paniccia et al. |
| 6,592,269 B1 | 7/2003 | Brophy et al. |
| 6,660,548 B2 | 12/2003 | Naydenkov et al. |
| 6,671,448 B2 | 12/2003 | Goto et al. |
| 6,684,015 B2 | 1/2004 | Johannessen |
| 6,690,036 B2 | 2/2004 | Liu et al. |
| 6,707,161 B2 | 3/2004 | Moon et al. |
| 6,718,233 B2 | 4/2004 | Sakhitab et al. |
| 6,728,449 B2 | 4/2004 | Trott |
| 6,739,762 B2 | 5/2004 | Ukechi et al. |
| 6,747,819 B1 | 6/2004 | Zbinden et al. |
| 6,747,820 B2 | 6/2004 | Zbinden et al. |
| 6,751,379 B2 | 6/2004 | Capewell et al. |
| 6,754,407 B2 | 6/2004 | Chakravorty et al. |
| 6,770,224 B2 | 8/2004 | Bair et al. |
| 6,771,859 B2 | 8/2004 | Carpenter |

(Continued)

OTHER PUBLICATIONS

H.K. Tonshoff, et al.: "Structuring Silicon with Femtosecond Lasers", Laser Applications in Microelectronic and Optoelectronic Manufacturing VI, Gower et al Editors. Proceedings of SPIE vol. 4274 (2001). pp. 88-97.

(Continued)

Primary Examiner—Frank G. Font
Assistant Examiner—Eric Wong
(74) Attorney, Agent, or Firm—Blakely, Sokoloff, Taylor & Zafman LLP

(57) ABSTRACT

Optical packages are disclosed. In one aspect, an optical package may include a surface, a microelectronic device coupled with the surface, a first waveguide coupled with the microelectronic device, a second waveguide having a first end that is evanescently coupled with the first waveguide and a second end, a first thickness of a cladding material disposed between the second end and the surface, and a second thickness of a cladding material disposed between the first end and the first waveguide. The first thickness may be greater than the second thickness. Methods of making the optical packages are also disclosed. Apparatus and methods of aligning operations on optical packages are also disclosed.

16 Claims, 7 Drawing Sheets

U.S. PATENT DOCUMENTS

| | | |
|---|---|---|
| 6,789,959 B1 | 9/2004 | Conn |
| 2002/0197025 A1 | 12/2002 | Vaganov et al. |
| 2003/0180006 A1 | 9/2003 | Loh et al. |
| 2004/0165812 A1* | 8/2004 | Blauvelt et al. ............ 385/14 |
| 2004/0264868 A1 | 12/2004 | Block et al. |
| 2005/0156310 A1* | 7/2005 | Benner et al. ............ 257/712 |

OTHER PUBLICATIONS

Cai et al., "An Effective Method for Coupling Single-Mode Fiber to Thin-Film Waveguide", Journal of Lightwave Technology, vol. 9, No. 5, May 1991 pp. 577-583.

* cited by examiner

OPTICAL PACKAGE

BACKGROUND

1. Field

Embodiments of the invention relate to optical packages, and methods of making the optical packages.

2. Background Information

The alignment and coupling of an optical fiber or other optical path with a small on-die waveguide or other optical device may be challenging. Often, a time consuming and expensive active alignment process may be used to improve the alignment.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
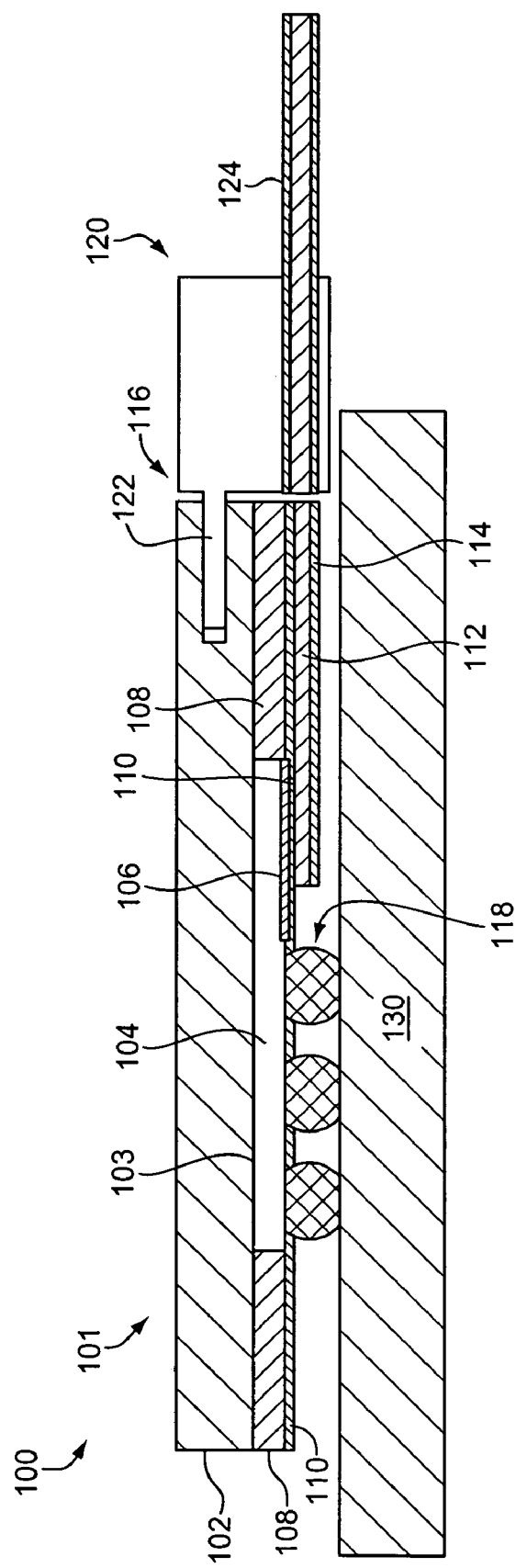
FIG. 1 shows an enlarged cross-sectional view of an optically coupled flip-chip package, according to one or more embodiments of the invention.

FIG. 1 shows an enlarged cross-sectional view of an optically coupled package 100, according to one or more embodiments of the invention. The package includes a cooling device-microelectronic device subassembly 101, and a substrate 130, such as, for example, a printed circuit board, that is coupled with the subassembly. In the illustrated package, which is a flip-chip package, interconnects 118, such as, for example, solder bumps, are used to couple the lower surface of the microelectronic device with the upper surface of the substrate. It should be noted that terms such as "lower", "upper", "top", "bottom", "right", "left", "vertical", "horizontal", and the like, are used herein to facilitate the description of the structure of the package "as illustrated". It will be evident that other embodiments of the invention are suitable for a variety of orientations including, but not limited to, an inverted orientation. For example, an inverted package based on wire bonding is contemplated.

The cooling device-microelectronic device subassembly includes an optional cooling device 102, such as, for example, an integrated heat spreader, and a microelectronic device 104, such as, for example, a die or thinned die, that is thermally and physically coupled with a surface 103 of the cooling device. In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical, electrical, and/or thermal contact. However, "coupled" may also mean that two or more elements are not in direct contact with each other, but yet still co-operate or interact with each other. For example, in one aspect, the cooling device may be coupled with the microelectronic device through an optional thermal interface material, such that the cooling device and the microelectronic device may be, but need not be, in direct physical contact. Now, the cooling device is optional, and is not required. In one or more alternate embodiments, the microelectronic device may be coupled with a surface of another material or support, regardless of whether it has cooling capability.

A first "on-device" waveguide 106 is coupled with the microelectronic device. The on-device waveguide may be located on-device or on-die, and may be optically and physically coupled with, or optionally connected to, the microelectronic device or die. In one or more embodiments of the invention, the microelectronic device may include an optical-electrical transducer or converter coupled with an end of the on-device waveguide. The transducer may transduce or otherwise convert an optical signal received from the waveguide to an electrical signal and/or convert an electrical signal received from the microelectronic device to an optical signal, which may be provided to the on-device waveguide. Alternatively, the microelectronic device may have further waveguides, lenses, or other optical devices, optically coupled with the on-device waveguide. However, the invention is not limited to just these types of couplings.

A second "package" waveguide 112 is evanescently or otherwise optically coupled with the on-device waveguide. The package waveguide may be located on-package rather than on-die. A first layer of cladding material 108 having a first thickness is disposed between the package waveguide and the surface of the cooling device. As shown, the first layer of cladding material may be placed side-by-side with, and in the same plane as, the microelectronic device. As viewed in the flip-chip orientation, a left edge of the first layer may abut and contact a right edge of the microelectronic device. A second layer of cladding material 110 having a second, but not necessarily different thickness, is disposed between the on-device waveguide and the package waveguide. In the illustrated embodiment, the second layer of cladding material is additionally disposed between the package waveguide and the cooling device, with the first layer of cladding material disposed therebetween, although this is not required. In one or more alternate embodiments, the second layer may optionally be omitted from in between the package waveguide and the first layer in the location alongside the microelectronic device. In any event, the cladding material of the second layer may be adjacent to and may abut both the core material of the package waveguide and the on-device waveguide.

The package waveguide may be evanescently or otherwise optically coupled with the on-device waveguide through the cladding material disposed therebetween. When light is transmitted through a waveguide, such as, for example, the package waveguide, an evanescent field may form in the cladding material of the second layer. The strength of the field may tend to decrease with increasing distance away from the waveguide. If the cladding material is sufficiently thin, a significant portion of the light transmitted through the waveguide may be evanescently coupled across the cladding material into the other waveguide located across the cladding material. The thickness of cladding material disposed between the on-device waveguide and the package waveguide, such as, for example, the thickness of the second layer, may be sufficiently thin to evanescently couple the on-device waveguide with the package waveguide. In one or more embodiments of the invention, a cladding material having a thickness that includes less than about 10 μm, or from about 1 to 5 μm, for example, may be disposed between the package waveguide and the on-device waveguide. For example, in the illustrated embodiment, the second layer of the cladding material may have a thickness that may be less than 10 μm, or that ranges from about 1 to 5 μm. Generally, more light may be coupled if the thickness is less than about 5 μm. The appropriate thickness may depend upon the particular cladding material, and wavelength of light, among other factors.

As shown in the illustrated embodiment, a greater thickness of cladding material may be disposed between the package waveguide and the cooling device, such as, for example, in order to help reduce optical losses to the cooling device. That is, a total thickness of cladding material disposed between the package waveguide and the surface of the cooling device may be greater than the thickness of cladding material disposed between the package and on-device waveguides. For example, as shown in the illustrated embodiment, the combined thickness of the first and the second layers of cladding material disposed between the package waveguide and the cooling device may be greater than the thickness of just the second layer of cladding material disposed between the waveguides. Any additional thickness of the first layer of cladding material may further optically insulate and decouple the cooling device from the package waveguide. If the second layer is optionally omitted from in between the package waveguide and the cooling device, a thickness of just the first layer may be greater than a thickness of the second layer of cladding material between the waveguides. The strength of the evanescent field generally diminishes with increasing thickness of the cladding layer, at least after a point, such that negligible light is evanescently coupled across a sufficiently thick cladding layer. In one or more embodiments, a thickness of cladding material disposed between the package waveguide and the cooling device may be sufficiently thick that a negligible amount of light is lost, or sufficiently thick to optically insulate the package waveguide from the cooling device, although this is not required. For example, in one or more embodiments of the invention, a cladding material having a thickness that includes more than about 10 μm may be sufficient.

Often, the first layer may be significantly thicker than 10 μm. As shown in the illustrated embodiment, a lower surface of the microelectronic device, farthest from the cooling device, may optionally be substantially coplanar with a lower surface of the first layer, although this is not required. As used herein, unless specified otherwise, substantially coplanar with means the surfaces are within two micrometers (μm, one millionth of a meter) of one another. The microelectronic device may include a die or thinned die, for example. The thinned die may have a thickness of at least about 25 μm all the way up to the thickness of an un-thinned die. Such a thickness is suitable for the thickness of the cladding material disposed between the package waveguide and cooling device. If appropriate, the microelectronic device may optionally be embedded in the cooling device, and the thickness reduced by the amount of embedding in order to maintain a planar surface with the embedded device.

As shown, an optional cladding material or layer 114 may be coupled with the package waveguide on an opposite side thereof as the first layer of cladding material, although the scope of the invention is not limited in this respect. The thickness of the cladding material or layer may be sufficiently thick to optically insulate the package waveguide, although this is not required.

In one or more embodiments of the invention, a core material of the package waveguide may have a different, such as, for example, higher index of refraction, than the cladding materials, which may either be the same or different cladding materials. For example, in one or more embodiments of the invention, a cladding material, such as, for example, a polymeric cladding material, may have an index of refraction ranging from about 1.4 to 1.8, and the core material may have a contrasting, such as, for example, higher index of refraction. The invention is not limited to any known different inn indices between the materials, although certain differences in indices may provide relatively less optical loss, as is known. Suitable core materials with such high index of refraction include, but are not limited to, high index of refraction acrylics, such as, for example, WIR30-480 (available from Zen Photonics of Daejeon, South Korea), high index of refraction polymers including benzocyclobutene (BCB, also known as bicyclo [4.2.0]octa-1,3,5-triene, or 1,2-dihydrobenzocyclobutene), such as, for example, Cyclotene 3022 (available from Dow Chemical of Midland, Mich.), high index of refraction polyimides, such as, for example, Ultradel 9120 (available from Amoco), and high index of refraction epoxies, such as, for example, AC-L2002-C1 (available from Addison Clear Wave of Evanston, Ill.). Combinations of these materials may also optionally be used. Suitable cladding materials with such low index of refraction include, but are not limited to, low index of refraction acrylics, such as, for example, MIR30-450 (available from Zen Photonics), low index of refraction polymers including BCB, such as, for example, perfluorocyclobutene (PFCB), low index of refraction polyimides, such as, for example, Ultradel 9020 (available from Amoco), and low index of refraction epoxies, such as, for example, AC R224-B (available from Addison Clear Wave). Combinations of these materials may also optionally be used.

Figure 2:
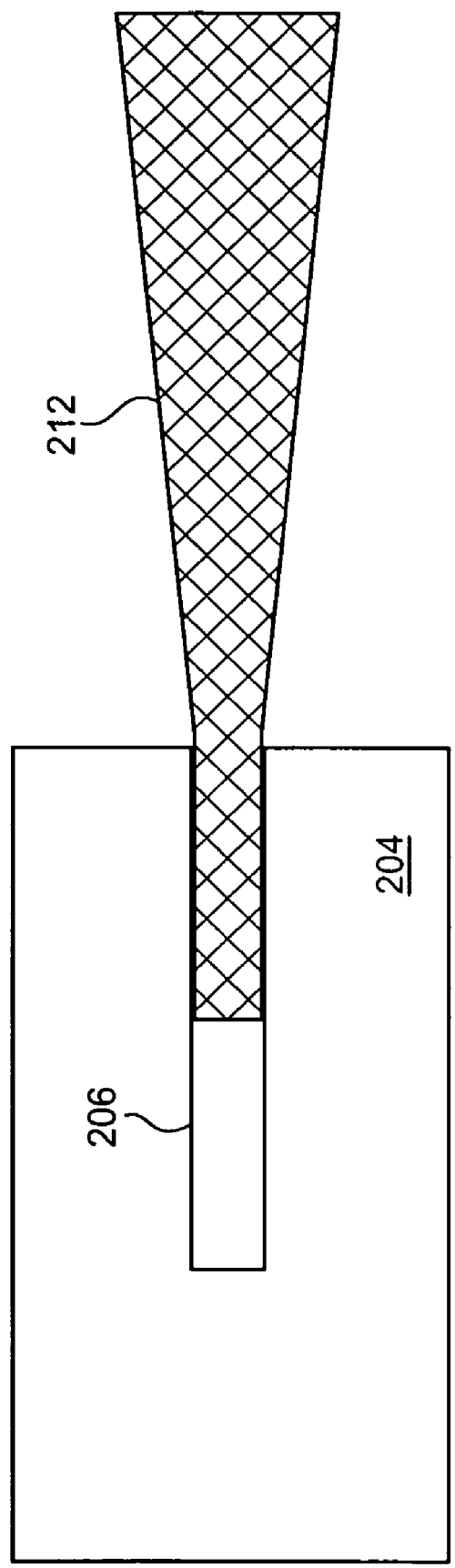
FIG. 2 shows an enlarged simplified top planar view showing the relative sizes and positions of a microelectronic device, on-device waveguide, and package waveguide, according to one or more embodiments of the invention.

FIG. 2 shows an enlarged, simplified, top-planar view of a microelectronic device 204, an on-device waveguide 206 coupled with the microelectronic device, and a package waveguide 212 coupled with the on-device waveguide, according to one or more embodiments of the invention. As shown, the package waveguide may be larger than the on-device waveguide. The package waveguide may have a first end that is relatively small and that may overlap a portion of the on-device waveguide, a second end that may optionally be larger, and a tapered middle section connecting the ends. As shown, the small end may have about the same width as the on-device waveguide, although this is not required, and may overlap the on-device waveguide. The invention is not limited to any known amount of overlap between the waveguides, although certain overlaps may provide relatively better coupling. In various aspects, the large end of the package waveguide may be about two, four, ten or more times greater than the width of the on-device waveguide, to give just a few examples. The thickness of the package waveguide may also optionally be greater than the thickness of the on-device waveguide. For example, the thickness of the package waveguide may be about two, four, ten, or more times greater than the thickness of the on-device waveguide, depending upon the particular implementation. The large end of the package waveguide may tend to facilitate alignment and coupling of an off-device optical connector, although the scope of the invention is not limited in this aspect.

Referring again to FIG. 1, in the illustrated embodiment, an optical connector 120 may be coupled with the package, although this is not required, and the package may also optionally be provided in an unconnected form. The optical connector includes an optical path 124 that may be aligned and optically coupled with the end of the package waveguide. As discussed above, in one or more embodiments of the invention, the end of the package waveguide may be large in order to facilitate alignment and coupling. Further, the illustrated optical connector includes one or more optional alignment structures 122, which may be coupled with one or more matching or otherwise corresponding alignment structures 116 on the package. For example, as shown in the illustrated embodiment, one or more pins, rods, dowels, or other male members of the optical connector may be inserted into one or more corresponding openings in the cooling device. In one or more embodiments of the invention, the one or more alignment structures of the package may be accurately positioned relative to the package waveguides, and the one or more alignment structures of the optical connector may be accurately positioned relative to the optical path. This may further facilitate alignment and coupling of the optical connector. In one aspect, a passive rather than active alignment operation may suffice, although the scope of the invention is not limited in this respect.

FIGS. 3-10 show enlarged cross-sectional views of intermediate assemblies representing different stages of a method of making a flip-chip package including an on-device waveguide and a package waveguide, according to one or more embodiments of the invention. FIG. 11 shows coupling the package with an optical connector, according to one or more embodiments of the invention.

Figure 3:
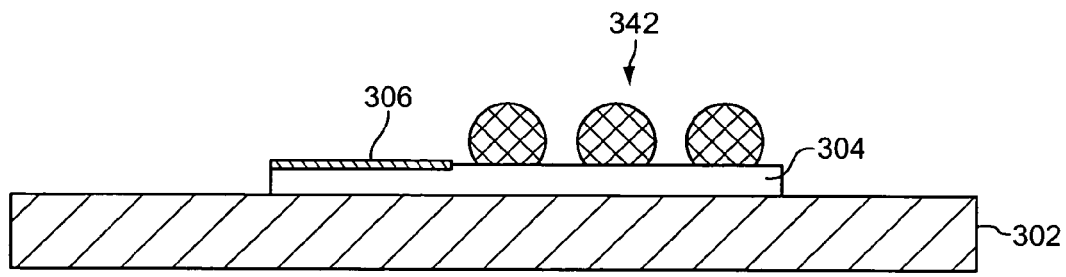
FIG. 3 shows an assembly including a cooling device, a microelectronic device coupled with an upper surface of the cooling device, a small on-device waveguide optically and physically coupled with the microelectronic device, and interconnects coupled with the upper surface of the microelectronic device, according to one or more embodiments of the invention.

In particular, FIG. 3 shows an assembly including a cooling device 302, such as, for example, an integrated heat spreader, a microelectronic device 304, such as, for example, a die, coupled with an upper surface of the cooling device, a small on-device waveguide 306 optically and physically coupled with the microelectronic device, and interconnects 342, such as, for example, solder bumps, coupled with the upper surface of the microelectronic device, according to one or more embodiments of the invention. Suitable integrated heat spreaders include, but are not limited to, nickel plated copper caps, and caps, plates, sheets, or similar structures of metals or other thermally conductive materials. In one aspect, the microelectronic device may be coupled with the cooling device through a thermal interface material, although the invention is not limited in this respect.

Figure 4:
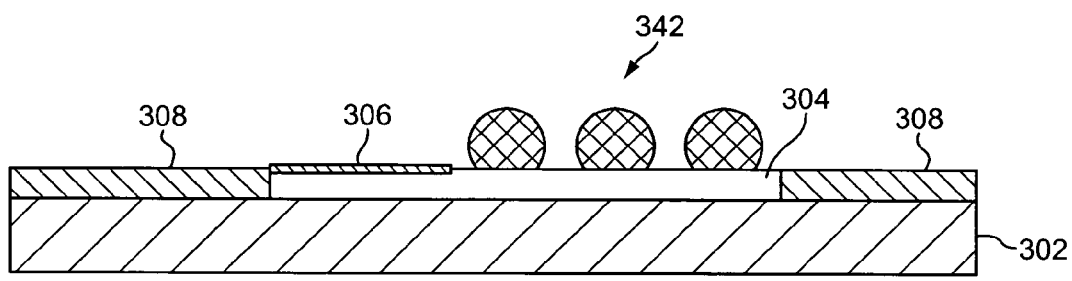
FIG. 4 shows an assembly after forming a first layer of cladding material over the assembly of FIG. 3, according to one or more embodiments of the invention.

FIG. 4 shows an assembly after forming a first layer of cladding material 308 over the assembly of FIG. 3, according to one or more embodiments of the invention. The first layer of cladding material may be formed by introducing a cladding material over, or in the illustrated case directly on, the upper surface of the cooling device. Suitable methods of introducing the cladding material include, but are not limited to, spin coating, lamination, stencil printing, and spray coating, to name just a few examples. In stencil printing and spray coating, a mask may optionally be used to conceal and protect the solder bumps and/or form a patterned layer, although this is not required. As shown in the illustrated embodiment, the top surface of the first layer, or the surface farthest from the cooling device, may optionally be substantially planar with the top surface of the microelectronic device, although this is not required. As further shown, the layer may optionally be disposed around the microelectronic device including on both sides thereof. This may be appropriate, for example, if other package waveguides are intended to be located around the microelectronic device. If other package waveguides are not intended to be located around the microelectronic device, portions of the layer may optionally be omitted or removed from such locations.

Figure 5:
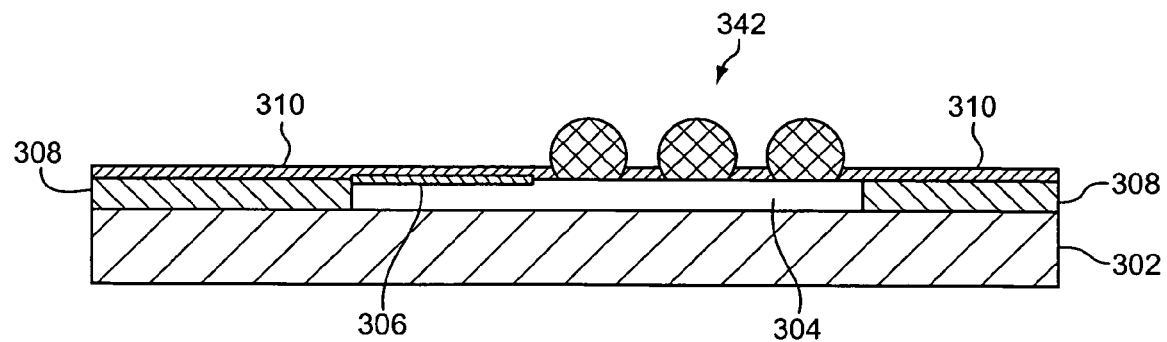
FIG. 5 shows an assembly after forming a second layer of cladding material over the assembly of FIG. 4, according to one or more embodiments of the invention.

FIG. 5 shows an assembly after forming a second layer of cladding material 310 over the assembly of FIG. 4, according to one or more embodiments of the invention. The second layer may be formed by introducing a cladding material, which may be either the same or different than the cladding material of the first layer, over, or in the illustrated case directly on, the assembly. Suitable methods of introducing the cladding material include, but are not limited to, spin coating and spray coating. If spray coating is used, a mask may optionally be used to protect the solder bumps and/or to selectively introduce the material in the positions where package waveguides are to be included, although this is not required. As discussed above, in one or more embodiments, the thickness of the cladding material introduced over the on-device waveguide may be sufficiently thin to allow evanescent coupling with the package waveguide through the thickness. Accurate control of the thickness may optionally be used to achieve a controlled amount of optical coupling. In the illustrated embodiment, the second layer is included over the first layer and over the microelectronic device, although this is not required. In one or more alternate embodiments, the second layer may optionally be omitted or removed from such locations.

Figure 6:
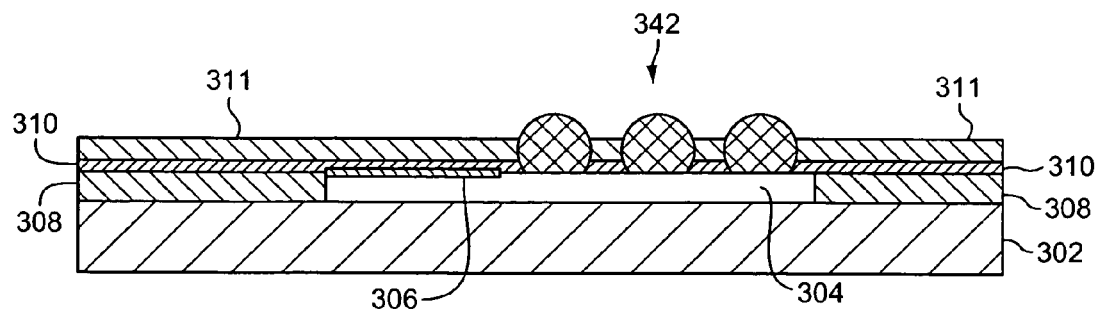
FIG. 6 shows an assembly after forming a waveguide core layer over the assembly of FIG. 5, according to one or more embodiments of the invention.

FIG. 6 shows an assembly after forming a waveguide core layer 311 over the assembly of FIG. 5, according to one or more embodiments of the invention. In one or more embodiments of the invention, the waveguide core layer may be formed by introducing a radiation sensitive waveguide core material over, or in the illustrated case directly on, the second layer of cladding material. Suitable methods of introducing the waveguide core material include, but are not limited to, spin coating and spray coating. If spray coating is used, a mask may optionally be used to protect the solder bumps, as in the illustrated embodiment, although this is not required, and the core material may also optionally subsequently be removed from the region including the solder bumps, such as, for example, during development. However, it is not required to use a radiation sensitive waveguide core material. In one or more embodiments of the invention, a waveguide core material that may otherwise be removed, such as, for example, by etching according to a patterned resist layer, may be introduced over the second layer of cladding material. In such embodiments, a mask may be used to conceal the solder bumps during introduction of the waveguide core layer.

Figure 7:
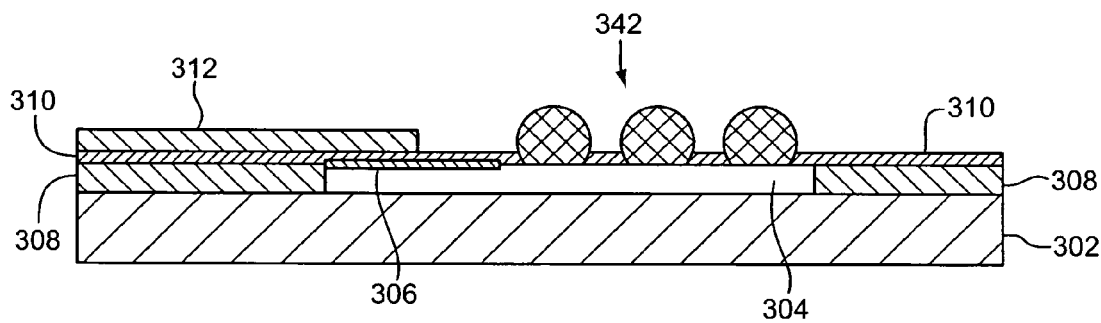
FIG. 7 shows an assembly after forming a package waveguide by patterning the waveguide core layer of FIG. 6, according to one or more embodiments of the invention.

FIG. 7 shows an assembly after forming a package waveguide 312 by patterning the waveguide core layer of FIG. 6, according to one or more embodiments of the invention. In one aspect, the radiation sensitive waveguide core layer may be patterned with lithography and development. As will be discussed below in connection with FIG. 12, in one or more embodiments of the invention, through waveguides may also optionally be patterned or defined in the waveguide core layer, such as, for example, by using the same mask as used for the package waveguide. However, the invention is not limited in this respect.

Figure 8:
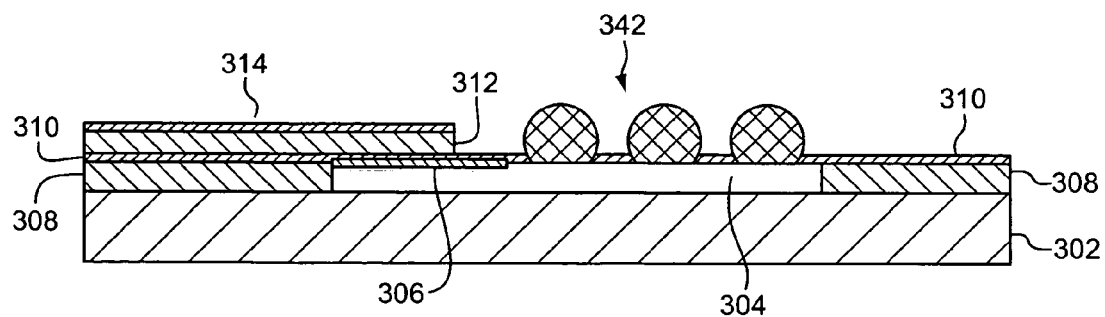
FIG. 8 shows an assembly after forming a third layer of cladding material over the assembly of FIG. 7, according to one or more embodiments of the invention.

FIG. 8 shows an assembly after forming an optional third layer of cladding material 314 over the assembly of FIG. 7, according to one or more embodiments of the invention. Suitable methods of introducing the cladding material include, but are not limited to, spin coating, stencil printing, and spray coating. If stencil printing or spray coating are used, a mask may optionally be used to protect the solder bumps, although this is not required. Portions of the layer may optionally be omitted or removed from locations not over the surface of the package waveguide.

Figure 9:
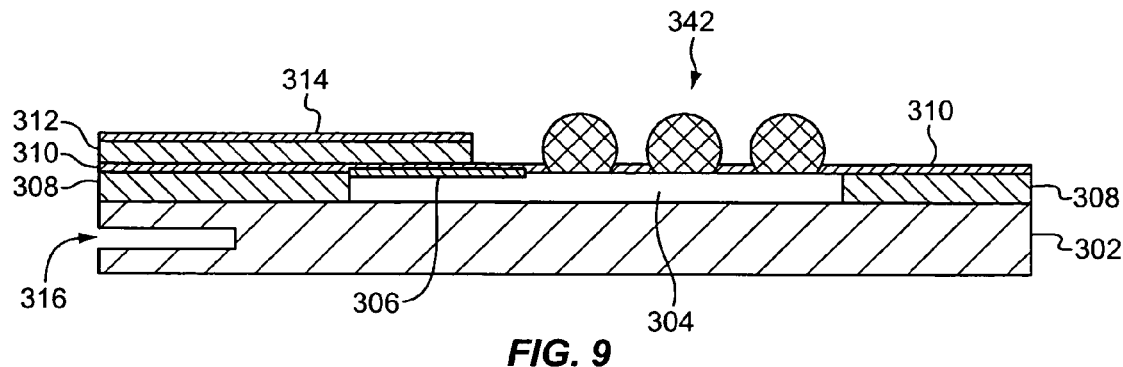
FIG. 9 shows an assembly after forming one or more alignment structures on the assembly of FIG. 8, according to one or more embodiments of the invention.

FIG. 9 shows an assembly after forming one or more alignment structures 316 on the assembly of FIG. 8, according to one or more embodiments of the invention. In the illustrated embodiment, the alignment structure includes one or more holes or other openings formed on the cooling device. Other suitable alignment structures include, but are not limited to, one or more trenches, notches, or bevels. Suitable methods of forming such openings or alignment structures include, but are not limited to, laser micromachining, such as, for example, with a femto second or other laser, mechanical milling or drilling, and chemical etching aided by lithography. In one or more embodiments of the invention, one or more male members may also optionally be included as alignment structures. For example, one or more pins, rods, dowels, or other male members, or a combination of such male members, may be coupled with the assembly, such as, for example with an adhesive, welding, rivet, or other fastener. In one aspect, a pick-and-place operation may be used to couple the male member with the assembly. The male members may also optionally be formed on the assembly, such as, for example, by micromachining. The cooling device may provide a hard material, such as, for example, copper or another metal, for forming the openings or male member alignment structures, although the invention is not limited to forming the alignment structure on the cooling device. In one aspect, two or more potentially different, spaced alignment structures may be employed to further aid alignment. As will be discussed further below, in one or more embodiments of the invention, light emitted from through waveguides may be used as a fiducial to align the operation of forming the alignment structures, although the scope of the invention is not limited in this respect.

Figure 10:
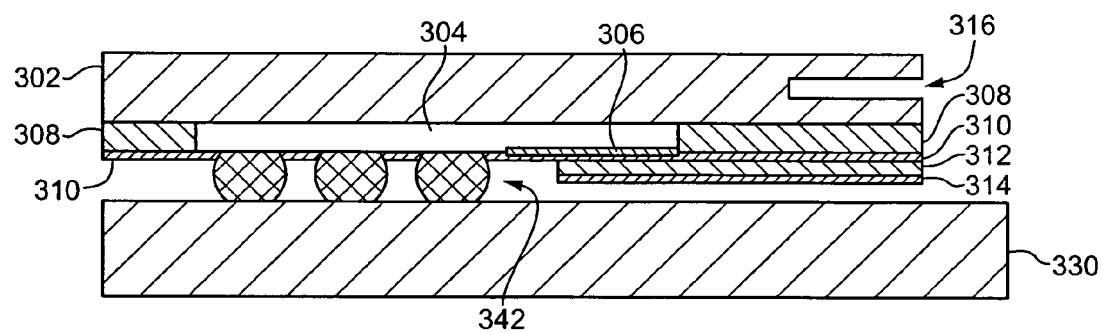
FIG. 10 shows an assembly after coupling the assembly of FIG. 9 to a substrate, such as, for example, a printed circuit board, according to one or more embodiments of the invention.
Figure 11:
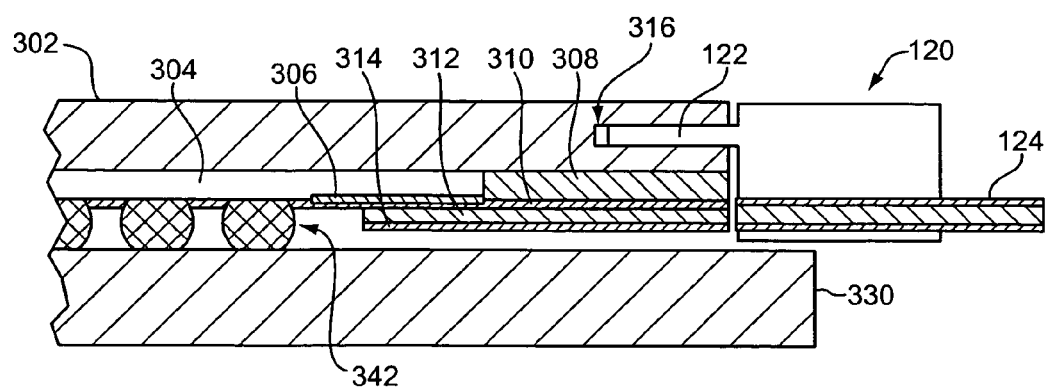
FIG. 11 shows the assembly of FIG. 10 optically coupled with a removable optical connector, according to one or more embodiments of the invention.

FIG. 10 shows an assembly after coupling the assembly of FIG. 9 to a substrate 330, such as, for example, a printed circuit board, according to one or more embodiments of the invention. As shown in the illustrated embodiment, the assembly may optionally be coupled to the substrate using the solder bumps 342 and flip-chip technology, although the invention is not limited in this respect.

FIG. 11 shows optically coupling the assembly of FIG. 10 with a removable optical connector 120, according to one or more embodiments of the invention. The removable optical connector includes an alignment structure 122, such as, for example, the illustrated male member, and an optical path 124. The optical connector may be brought in close proximity to the assembly, the alignment structure of the optical connector may be aligned and coupled with the corresponding alignment structure of the assembly, and then the optical connector and the assembly may be brought together. In binging the optical connector and the assembly together, the optical path of the optical connector may autonomously align and couple with the end of the package waveguide, which may optionally be large enough to facilitate alignment and/or be sufficiently large to allow passive rather than active alignment, although the scope of the invention is not limited in this respect.

Now, the invention is not limited to the particular method described above. Operations may optionally be added to and/or removed from the method. As one example, in one or more embodiments, the formation of the alignment openings may optionally be omitted. As another example, in one or more embodiments, the coupling of the microelectronic device to the cooling device may optionally be omitted. Operations may also optionally be performed in different sequence than shown above. As one example, in one or more embodiments, the second layer of cladding material may be formed over the microelectronic device and on-device waveguide prior to coupling the microelectronic device to the cooling device. As another example, in one or more embodiments, the alignment opening may be formed in the cooling device prior to coupling of the microelectronic device to the cooling device. Many further modifications and/or adaptations may be made.

Figure 12:
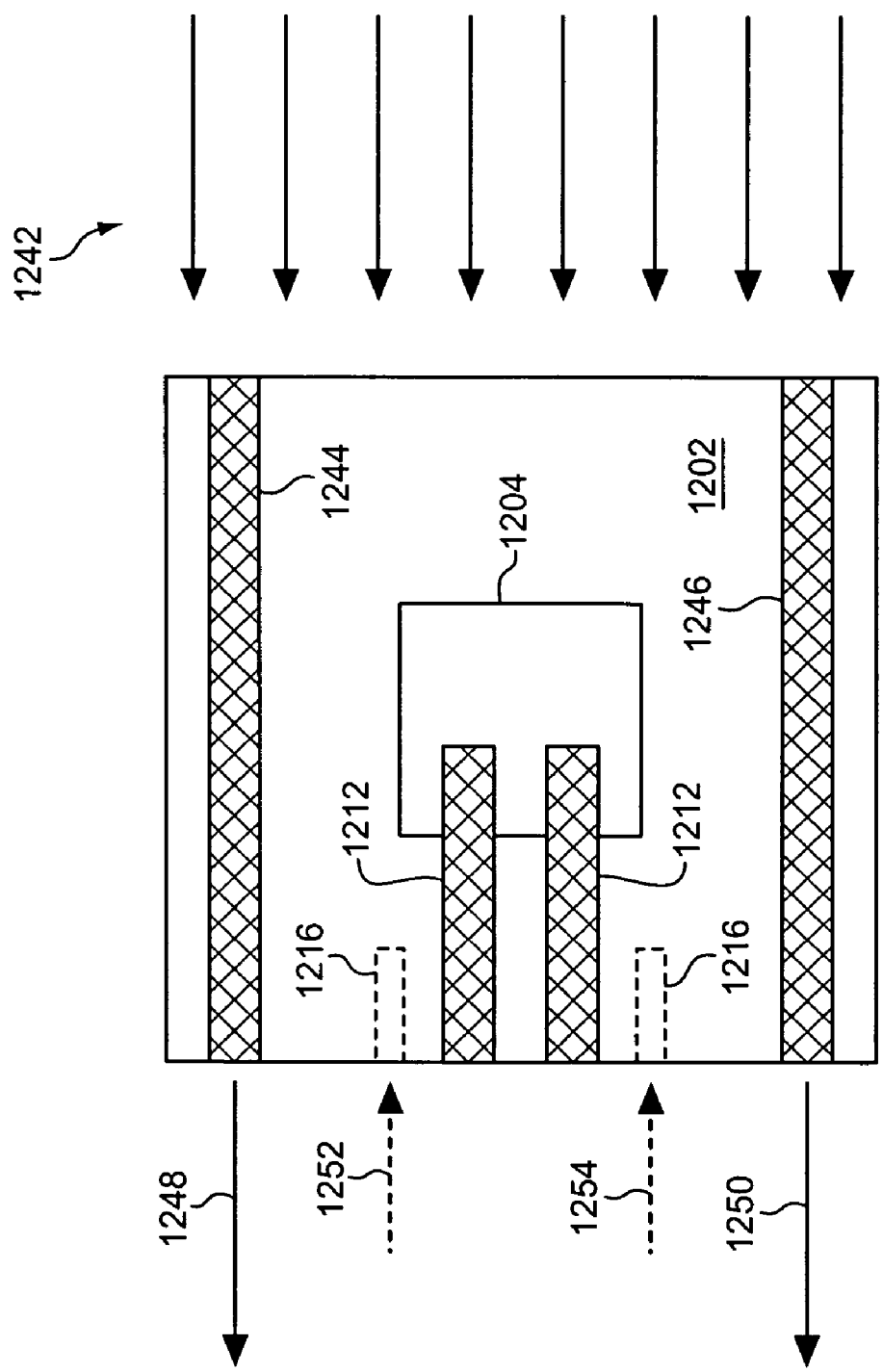
FIG. 12 illustrates a method of forming one or more alignment structures on an apparatus by using light emitted by one or more waveguides of the apparatus as a fiducial, according to one or more embodiments of the invention.

FIG. 12 illustrates aligning an operation, such as forming one or more alignment structures, on an assembly, workpiece, or other apparatus by using light emitted by one or more waveguides of the apparatus as a fiducial, according to one or more embodiments of the invention. The illustrated apparatus includes a solid material 1202, such as, for example, copper or another metal of a cooling device, a microelectronic device 1204 that may be coupled with the solid material, and one or more optical devices 1212, such as, for example, in the illustrated embodiment, two package waveguides, which are optically coupled with the microelectronic device, for example, to exchange optical signals with the microelectronic device. The illustrated apparatus further includes one or more or two through waveguides 1244, 1246 that are coupled with the apparatus, such as, for example, coupled with a surface of the solid material, and one or more or two alignment structures 1216, such as, for example, openings in the solid material. As shown, the ends of the through waveguides are optically uncoupled and light may be received, transmitted, and emitted from the waveguides from one end to the other.

A method, according to one or more embodiments of the invention, may include emitting light from the one or more through waveguides of the apparatus, and aligning an operation relative to the apparatus based on the light emitted from the one or more through waveguides. Light 1242 may be transmitted or otherwise provided to the apparatus. A laser, bulb, or other light source may be used to provide the light. A first portion of the light may be received at the right-hand end of a first through waveguide 1244, transmitted across the waveguide, and emitted as a first light 1248 from the left-hand end of the first through waveguide. Likewise, a second portion of the light may be received at the right-hand end of a second through waveguide 1246, transmitted across the waveguide, and emitted as a second light 1250 from the left-hand end of the second through waveguide.

Then, the operation may be aligned based on the light emitted from the through waveguides. The light may be detected or observed. In one or more embodiments of the invention, the left-hand or emitting ends of the through waveguides and/or the light emitted from these ends may be used as a fiducial to align the operation. A fiducial may represent one or more identifiable features, or a pattern of identifiable features, such as, for example, light emitted from a waveguide and/or an end of the waveguide, which may be used as a standard of reference, such as, for location.

In one or more embodiments of the invention, the operation that is aligned may include an operation to form the one or more alignment structures 1216 on the apparatus. For example, the operation may form one or more openings, trenches, bevels, notches, or male members on the solid material. In one aspect, the operation may include a micromachining operation. For example, laser ablation, drilling, milling, or other micromachining may be aligned relative to the apparatus and used to form openings in the solid material. In another aspect, the operation may include a pick-and-place operation. For example, an operation to place a pin, rod, dowel, or other male member on the apparatus may be aligned. For example, male members 1252, 1254 may be introduced into the alignment structures 1216.

By using the fiducial, such as, for example, the light emitted from the waveguides, the alignment structures so formed may be accurately aligned and positioned relative to the waveguides. In one or more embodiments of the invention, the uncoupled ends of the package waveguides may be accurately positioned relative to the emitting ends of the through waveguides. In order to encourage accurate relative positioning, in one or more embodiments, the package waveguides and through waveguides may be formed together lithographically by using the same mask. For example, a waveguide core layer may be deposited, the package and through waveguides may be patterned or defined in the waveguide core layer using the same mask, and then the patterned layer may be developed. Other approaches capable of achieving accurate positioning may also optionally be used. In any event, the ability to form alignment structures that are accurately positioned relative to the one or more package waveguides or other optical devices may offer a potential advantage of facilitating and/or improving alignment and coupling of an optical connector, and may potentially allow passive rather than active alignment, although the invention is not limited in this respect.

Other embodiments of the invention are not limited to aligning an operation to form an alignment structure. For example, another suitable operation may include coupling an optical connector with the apparatus. In one aspect, a pick-and-place operation to couple the optical connector may be aligned relative to the apparatus. Other suitable operations include, but are not limited to, testing, inspection, other micromachining operations, etc.

Machine vision may be used to improve alignment of the operation, according to one or more embodiments of the invention. Machine vision may involve the acquisition and analysis of one or more images or other data collected of an apparatus, and the control of an operation associated with the apparatus based at least in part on the analysis. A representative machine vision system may include lighting and optics to illuminate and focus onto the apparatus, a camera to obtain an image of the apparatus, potentially a frame grabber to convert camera data to digital data, a computer to process data, and image-processing software to estimate a position, orientation, or other location of the apparatus based on the image.

The machine vision system may capture an image of the apparatus including detecting the light emitted from the through waveguides and/or the ends of the through waveguides. If appropriate, the frame grabber may convert the camera data to digital data. The digital data may be processed by the computer running the image processing software in order to estimate a location of the apparatus based at least in part on the cameras view of the ends of the through waveguides and/or the light emitted from the through waveguides. In one or more embodiments of the invention, the ends of the through waveguides and/or the light emitted from the through waveguides may be recognized by the machine vision system as a fiducial and used to estimate the location of the apparatus. In one aspect, the fiducial may be recognized by the machine vision system based at least in part on a predetermined image stored within the machine vision system or other predetermined information that may be used to train or calibrate the machine vision system. The machine vision system may compare the fiducial viewed by the camera with data representing a predetermined fiducial of known or standard location and estimate the location of the apparatus based on the comparison.

Then, the operation may be aligned based on the estimated location of the apparatus. In one aspect, the estimated location may be transformed to robot coordinates and provided to a robot controller. The robot controller may control the movement of a robot arranged and/or configured to perform the operation on the apparatus based at least in part on the location information. The robot and/or the apparatus may be moved together relative to one another and aligned under the guidance of the machine vision system. If appropriate, image capture, location estimation, and relative location adjustment may optionally be repeated multiples times, for example, in order to obtain alignment.

The packages disclosed herein may be included in a variety of electronic device. Suitable examples of electronic devices include, but are not limited to, computer systems, networking equipment, communications equipment, wireless devices, and the like.

Figure 13:
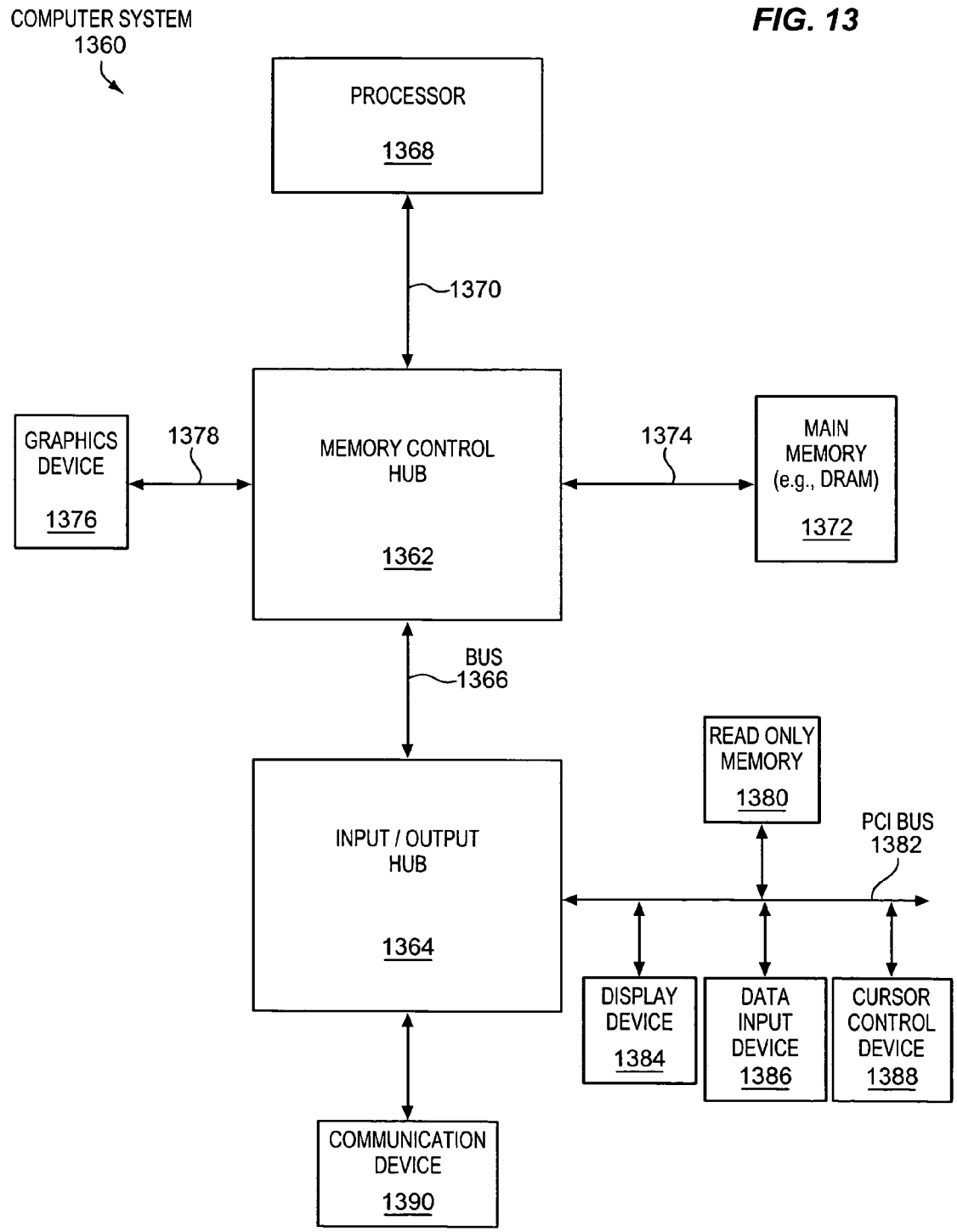
FIG. 13 shows block diagram of a computer system, according to one or more embodiments of the invention.

FIG. 13 shows a block diagram of a computer system 1360, according to one or more embodiments of the invention. As used herein, a "system" or "computer system" may include an apparatus having hardware and/or software for processing data. The computer system may include, but is not limited to, a portable, laptop, desktop, server, or mainframe computer. The computer system represents one possible computer system for implementing one or more embodiments of the present invention, however other computer systems and variations of the computer system are also possible.

The computer system includes a memory control hub 1362 coupled with an input/output hub 1364 through a first bus 1366, which may communicate information between the hubs. A processor 1368, which may process information, is coupled with the memory control hub through a second bus 1370, such as, for example, a front-side bus. In one or more embodiments of the invention, the processor may include a microprocessor available from Intel Corporation, of Santa Clara, Calif.

In one or more embodiments of the invention, the processor may be optically coupled with the memory control hub, such as, for example, using optical signals conveyed through package and on-device waveguides as disclosed elsewhere herein. Alternatively, in one or more other embodiments, processor and memory control hub may be combined into a single microelectronic device. In such embodiments, the microelectronic device may be optically coupled with another computer system component, such as, for example, a memory. Still further, in one or more embodiments of the invention, the processor may be optically coupled with a second processor through package and on-device waveguides. However, the scope of the invention is not limited to these couplings, or just these couplings.

The computer system further includes a main memory 1372, such as, for example, a random access memory (RAM) or other dynamic storage device, coupled with the memory control hub via a third bus 1374. The main memory may store information including instructions to be executed by the processor. Different types of RAM memory that are included in some, but not all computer systems, include, but are not limited to, static-RAM (SRAM) and dynamic-RAM (DRAM). A graphics device 1376 may optionally be coupled with the memory control hub via a fourth bus 1378.

The computer system also includes a read only memory (ROM) 1380 coupled with the input/output hub through a fifth bus 1382, such as, for example, a PCI (peripheral components interconnect) bus. The read only memory may store static information and instructions for the processor, such as, for example, the basic input-output system (BIOS). Different types of memory that are included in some, but not all, computer systems include Flash memory, programmable ROM (PROM), erasable-and-programmable ROM (EPROM), and electrically-erasable-and-programmable ROM (EEPROM).

As shown, a number of input and/or output devices may also optionally be coupled with the input/output hub via the fifth bus. A display device 1384, such as, for example, a cathode ray tube (CRT) or liquid crystal display (LCD), may be included to display information to an end user. A data input device 1386, such as, for example, a keyboard or other alphanumeric input device including alphanumeric and other keys, may be included to communicate information and command selections to the processor. A cursor control device 1388, such as, for example, a mouse, trackball, or cursor direction keys, may be included to communicate direction information and command selections to the processor, and to control cursor movement on the display device.

A communication device 1390 may also be coupled with the input/output hub. As shown, the communication device may optionally be coupled with the input/output hub through a sixth bus, such as, for example, a high-speed bus. Communication devices are employed in some, but not all, computer systems. Depending upon the particular implementation, the communication device may include a modem, a network interface card, or other well-known interface devices, such as, for example, those used for coupling with Ethernet, token ring, or other types of physical attachment for purposes of providing a communication link to support a local or wide area network, for example.

Other devices may also optionally be included. For example, a mass storage device, such as, for example, a magnetic disk, zip, or optical disc and its corresponding drive may also be coupled with the computer system to store information and instructions. In one or more embodiments of the invention, any one or more of the components of the computer system may optionally be interconnected with a hub, bridge, or switch, or with another component by using the package and on-device waveguide couplings as disclosed elsewhere herein.

In the description above, for the purposes of explanation, numerous specific details have been set forth in order to provide a thorough understanding of the embodiments of the invention. Other embodiments may be practiced without some of these specific details. In other instances, well-known circuits, structures, devices, and techniques have been shown in block diagram form or without detail in order not to obscure the understanding of this description.

Many of the methods are described in their most basic form, but operations may be added to or deleted from the methods. Many further modifications and adaptations may be made. The particular embodiments are not provided to limit the invention but to illustrate it. The scope of the invention is not to be determined by the specific examples provided above but by the claims below.

In the claims, any element that does not explicitly state "means for" performing a specified function, or "step for" performing a specified function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

While the invention has been described in terms of several embodiments, the invention is not limited to the embodiments described, but may be practiced with modification and alteration within the spirit and scope of the appended claims. The description is thus to be regarded as illustrative instead of limiting.

What is claimed is:

1. An apparatus comprising:
   a cooling device and a microelectronic device coupled with the cooling device;
   an on-device waveguide that is on the microelectronic device;
   a second waveguide having a first end that is evanescently coupled with the on-device waveguide and a second end, wherein one or more of a width and a thickness of
the second end of the second waveguide is larger than
that of the on-device waveguide;
a first thickness of cladding material disposed between the
second waveguide and the cooling device, and a second
thickness of cladding material, which is thinner than
the first thickness, disposed between the on-device
waveguide and the second waveguide; and
a removable optical connector having an optical path that
is aligned with the second end of the second waveguide
to exchange optical signals with the second end.

2. The apparatus of claim 1:
wherein the cooling device comprises an integrated heat
spreader;
wherein the microelectronic device comprises a thinned
die;
wherein the cladding materials each have a lower index of
refraction than a material of the second waveguide; and
wherein the second thickness is less than ten micrometers,
and wherein the first thickness is greater than ten
micrometers.

3. The apparatus of claim 1, further comprising:
one or more alignment structures on the cooling device;
and
a through waveguide coupled with the apparatus to provide a reference for the one or more alignment structures.

4. An apparatus comprising:
a surface, a microelectronic device coupled with the
surface, and a first waveguide on the microelectronic
device;
a second waveguide having a first end that is evanescently
coupled with the first waveguide, and a second end,
wherein one or more of a width and a thickness of the
second end of the second waveguide is larger than that
of the first waveguide, wherein a width of the second
end is greater than a width of the first end, and wherein
the second waveguide has a tapered middle section
connecting the first and second ends;
a first thickness of a cladding material disposed between
the second end and the surface; and
a second thickness of a cladding material disposed
between the first end and the first waveguide, wherein
the first thickness is greater than the second thickness.

5. The apparatus of claim 4:
wherein the first thickness is sufficiently thick to insulate
the second waveguide from the surface; and
wherein the second thickness is sufficiently thin to evanescently couple the waveguides.

6. The apparatus of claim 5:
wherein the first thickness is greater than ten micrometers;
and
wherein the second thickness is less than ten micrometers.

7. The apparatus of claim 6, wherein the second thickness
is less than five micrometers.

8. The apparatus of claim 4;
wherein the surface comprises a surface of a cooling
device;
wherein the microelectronic device comprises a thinned
die;
wherein the first waveguide comprises an on-device
waveguide;
wherein a width and a thickness of the second waveguide
is larger than a width and a thickness of the first
waveguide;
wherein the first thickness is greater than ten micrometers;
and
wherein the second thickness is less than five micrometers.

9. A system comprising:
a bus;
a dynamic random access memory coupled with the bus;
and
a package coupled with the bus, the package including:
a surface, a microelectronic device coupled with the
surface, and a first waveguide on the microelectronic
device;
a second waveguide having a first end that is evanescently
coupled with the first waveguide, and a second end,
wherein one or more of a width and a thickness of the
second end of the second waveguide is larger than that
of the first waveguide, wherein a width of the second
end is greater than a width of the first end, and wherein
the second waveguide has a tapered middle section
connecting the first and second ends;
a first thickness of a cladding material disposed between
the second end and the surface; and
a second thickness of a cladding material waveguide
disposed between the first end and the first waveguide,
wherein the first thickness is greater than the second
thickness.

10. The system of claim 9:
wherein the first thickness is sufficiently thick to insulate
the second waveguide from the surface; and
wherein the second thickness is sufficiently thin to evanescently couple the waveguides.

11. The system of claim 10:
wherein the first thickness is greater than ten micrometers;
and
wherein the second thickness is less than ten micrometers.

12. The system of claim 11, wherein the second thickness
is less than five micrometers.

13. The system of claim 9:
wherein the surface comprises a surface of a cooling
device;
wherein the first waveguide comprises an on-device
waveguide;
wherein a width and a thickness of the second waveguide
is larger than a width and a thickness of the first
waveguide;
wherein the first thickness is greater than ten micrometers;
and
wherein the second thickness is less than five micrometers.

14. An apparatus comprising:
a cooling device, microelectronic device coupled with the
cooling device, and an on-device waveguide on the
microelectronic device;
one or more through waveguides coupled with the cooling
device; and
optically uncoupled ends of the one or more through
waveguides; and
one or more alignment structures accurately positioned on
the cooling device relative to the uncoupled ends.

15. The apparatus of claim 14, wherein the optical device
is accurately positioned relative to the uncoupled ends of the
one or more through waveguides.

16. The apparatus of claim 14:
wherein the one or more alignment structures comprise
one or more openings on the cooling device.

* * * * *